United States Patent
Wen et al.

(10) Patent No.: US 6,775,029 B1
(45) Date of Patent: Aug. 10, 2004

(54) METHOD FOR EFFICIENT CALIBRATION OF PRINTING DEVICES

(75) Inventors: Zhenhuan Wen, Rochester, NY (US); Shen-ge Wang, Fairport, NY (US); Fritz F. Ebner, Rochester, NY (US)

(73) Assignee: Xerox Corporation, Stamford, CT (US)

(*) Notice: Subject to any disclaimer, the term of this patent is extended or adjusted under 35 U.S.C. 154(b) by 870 days.

(21) Appl. No.: 09/699,872

(22) Filed: Oct. 30, 2000

(51) Int. Cl.⁷ .............................................. G06F 15/00
(52) U.S. Cl. ........................................ 358/1.9; 358/504
(58) Field of Search .................... 358/1.1, 1.4, 1.9, 358/1.14, 1.15, 3.01, 3.03, 3.06, 3.07, 3.2, 504, 519, 501, 518; 382/162, 167

(56) References Cited

U.S. PATENT DOCUMENTS

| | | | |
|---|---|---|---|
| 5,160,938 A | * 11/1992 | Fargo et al. | 347/19 |
| 5,339,176 A | * 8/1994 | Smilansky et al. | 358/504 |
| 5,508,826 A | * 4/1996 | Lloyd et al. | 358/501 |
| 5,519,419 A | * 5/1996 | Stephany et al. | 347/19 |
| 5,649,073 A | 7/1997 | Knox et al. | 395/109 |
| 5,748,330 A | 5/1998 | Wang et al. | 358/298 |
| 5,859,955 A | 1/1999 | Wang | 395/109 |
| 5,943,477 A | * 8/1999 | Rao et al. | 358/1.8 |
| 5,978,556 A | 11/1999 | Wang | 395/109 |
| 6,215,562 B1 | * 4/2001 | Michel et al. | 358/1.9 |
| 6,425,325 B1 | * 7/2002 | Mukai et al. | 101/130 |
| 6,431,679 B1 | * 8/2002 | Li et al. | 347/19 |
| 6,435,654 B1 | * 8/2002 | Wang et al. | 347/43 |
| 6,575,095 B1 | * 6/2003 | Mahy et al. | 101/485 |
| 6,582,048 B1 | * 6/2003 | Akahira et al. | 347/19 |
| 6,606,167 B1 | * 8/2003 | Rees et al. | 358/1.9 |
| 6,736,485 B2 | * 5/2004 | Kushner et al. | 347/43 |

* cited by examiner

Primary Examiner—Gabriel Garcia
(74) Attorney, Agent, or Firm—William Eipert

(57) ABSTRACT

A method for characterizing a printing device response for a halftone screen includes (a) generating a plurality of test patches, each test patch comprising a dot pattern having less than three different base patterns for the halftone screen; (b) measuring the luminance of selected ones of the test patches; (c) plotting the luminance measurements to provide a set of calibrated points on a printer calibration curve; and (d) generating the printer calibration curve between adjacent calibrated points using an equation establishing a relationship between ink area coverage and reflectance of the image.

10 Claims, 5 Drawing Sheets

METHOD FOR EFFICIENT CALIBRATION OF PRINTING DEVICES

BACKGROUND OF THE INVENTION

The present invention relates generally to methods for calibrating halftone screens, and more particularly, to a method for characterizing a tone response curve for a printing device to enable the calibration of a halftone screen.

Digital halftoning is a process in which digital input signals to a digital printer are modified prior to printing a hard copy, such that a digitally printed version of a photographic image creates the illusion of the continuous tone scale of the photographic original. Most ink-jet printers and electrophotographic "laser" printers ultimately operate in a binary mode, i.e., a spot is either printed or not at a specified location. Typically, digital halftoning or screening techniques control the printing of spots to obtain the illusion of continuous tones based upon a comparison of the required shade of gray with one of a set of predetermined threshold levels. If the gray is darker than a given threshold level, a spot is printed. If the gray is not as dark as a given threshold level, a spot is not printed.

To print an image using a given halftone screen, the screen must be calibrated for a particular or target printer. Calibration refers to setting the threshold values of the halftone screen (also referred to as generating the screen matrix) so that a given input gray is well represented by the printed image. This calibration is a slow and laborious process that has to be repeated for every halftone screen that one wants to use. The calibration will remain valid as long as the printer characteristics do not change.

The calibration of halftone screens requires the generation of a tone response curve (TRC) for the target printer which determines how much toner will be applied for a given image data input. A conventional process for generating a TRC involves printing test patches for a wide range of dot patterns for a given halftone screen using by the target printer and toner. The gray levels of the printed patches are measured and the measurements are plotted against the actual number of ON pixels in the dot pattern. The plot is then smoothed and the resulting curve is then normalized to form the TRC.

Although the conventional process can be used to generate a good representation of the overall tone response for the printer, it is generally a lengthy and protracted process to print, measure and analyze the large number of dot patterns available in most halftone screens. Additionally, the process is subject to measurement noise, resulting in a TRC that does not accurately reflect the printer's response. While measurement noise can be reduced by increasing the number of measurements for each given dot pattern, this comes at the expense of increased processing time. Furthermore, the curve smoothing functions employed to remedy the measurement noise can introduce distortions into the TRC.

SUMMARY OF THE INVENTION

In accordance with one aspect of the present invention, there is provided a method for characterizing printer response. The method includes (a) generating a plurality of test patches, each test patch comprising a dot pattern having less than three different base patterns for the halftone screen; (b) measuring the luminance of selected ones of the test patches; (c) plotting the luminance measurements to provide a set of calibrated points on a printer calibration curve; and (d) generating the printer calibration curve between adjacent calibrated points using an equation establishing a relationship between ink area coverage and reflectance of the image.

DETAILED DESCRIPTION OF THE INVENTION

Figures 1, 2:
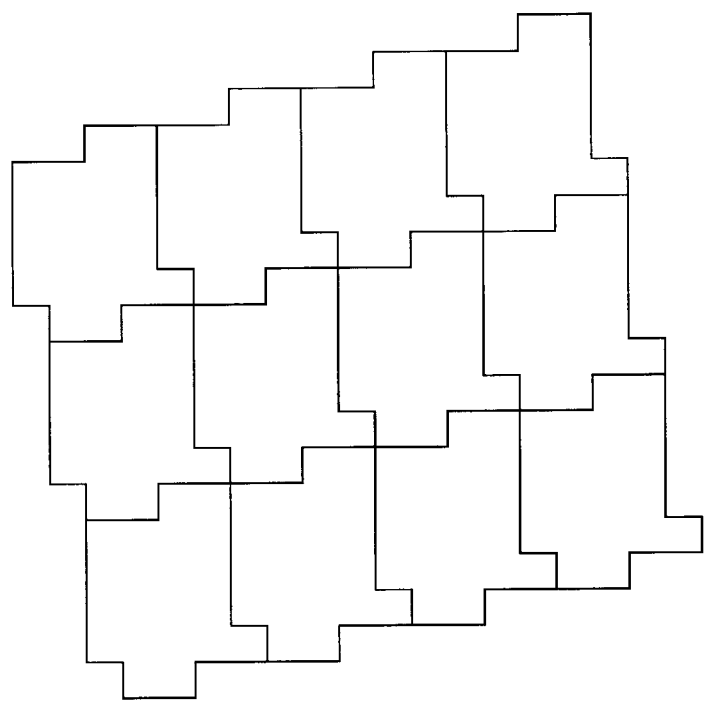
FIG. 1 illustrates a halftone screen comprising a plurality of base cells.
FIG. 2 shows a base cell of the halftone screen of FIG. 1.

The following will be a detailed description of the drawings which are given for purposes of illustrating the preferred embodiments of the present invention, and not for purposes of limiting the same. In this description, as well as in the drawings, like reference numbers represent like devices, circuits, or circuits performing equivalent functions.

As used herein, the term "dot pattern" refers to a product or an image resulting from a halftone screening process. "Halftone screening", as used herein, refers to comparing a set of pixels together to halftone screen, or screen matrix, to form the dot pattern. That is, the term "halftone screen", or "screen matrix", will be used to describe the set of values which together make up the set of thresholds to be applied in halftone screening process to generate a dot pattern. A "base cell" refers to a small sub cell of a halftone screen, which the halftone screen can be divided into using a general multi-center dot scheme. A base cell with M (M>1) elements defines M+1 different base pattern, which corresponds to M+1 different gray levels (including the complete white).

A "pixel" refers to an image signal associated with a particular position in an image, having a density between white and black. Accordingly, pixels are defined by intensity and position. A dot pattern is made up of a plurality of pixels from the halftone screening in accordance with the screen matrix. These terms are used for simplification and it should be understood that the appropriate sizing operations have to be performed for images where the input resolution in terms of scan pixels is different from the output resolution in terms of print pixels. The term "luminance" refers to the luminous intensity per unit area and for the following discussion, it also represents the general tone measurement, such as density, color difference, brightness/lightness, reflectance or any other light measurement.

The present invention includes a process to quickly and accurately characterize a calibration curve such as the tone response curve (TRC) of given printer for a selected halftone screen. The process is based on the principle that all possible dot patterns generated by a halftone screen which is comprised of one or more base cells can be accurately described as the spatial combination of a small set of base patterns and that the spatial combination of the base patterns is analogous to the mixing of printed spots (black dots) and non-printed (white) paper area which is described by various models concerned with modeling the properties of light, ink, paper and eye interactions such as those described by Neugebauer, Murray-Davies, Yule-Nielsen, Clapper-Yule, BeerBouguer, Kubelka-Munk, and others.

More specifically, consider any halftone screens, including line screens, that can be characterized as comprising $N \geq 1$ base cells (or sub cells) wherein each of the base cells within the screen has the same size (M pixels) and shape. Using the base cell alone as the halftone screen (i.e., N=1), there are only M+1 possible dot patterns, each of which identifies a "base pattern", that can be generated. These base patterns can be identified as $P_0, P_1, P_2, \ldots, P_M$, wherein the subscript identifies the number of filled pixels within the base pattern. That is, $P_0$ has no 'ON' pixels in the pattern, $P_1$ has one 'ON' pixel and $P_M$ has all pixels 'ON'.

Any of the possible dot patterns that can be generated by the halftone screen with $N \geq 1$ base cells are spatial combinations of the M+1 base patterns. Furthermore, if the halftone screen is designed to constrain the dot pattern to comprise no more than two base patterns for a constant input, as is often done to achieve an optimal output with minimal artifacts, there are only M×N+1 possible dot patterns each of which can be described as the spatial combination of two base patterns. Operating under the above constraint, if a dot pattern generated by the halftone screen is composed of two base pattern $P_m$ and $P_{m+1}$, adding pixels to the dot pattern decreases the number $P_m$ base patterns and increases the number $P_{m+1}$ base patterns within the dot pattern, in an amount corresponding to the number of added pixels.

Spatially mixing two microstructures e.g., $P_m$ and $P_{m+1}$, is similar to mixing printed dot patterns and unprinted area described by various models. For example, using the modified Yule-Nielsen equation the reflectance for any dot pattern comprised of some combination of $P_m$ and $P_{m+1}$ base patterns is given by:

$$r^{1/n} = a_m r_m^{1/n} + a_{m+1} r_{m+1}^{1/n} \quad (1)$$

where $a_m$, $a_{m+1}$ are the area of the base patterns within the dot pattern; $r_m$, $r_{m+1}$ are the reflectance of the base patterns; and n is the Yule-Nielsen coefficient. The reflectance $r_m$ and $r_{m+1}$ can be obtained by measurement of two test patches comprising dot patterns composed solely of $P_m$ and $P_{m+1}$ base patterns, respectively. The areas $a_m$, $a_{m+1}$ can be accurately estimated by the numbers of $P_m$ and $P_{m+1}$ base patterns, respectively, in the dot pattern. Furthermore, as indicated by Yule and others, a good estimation of the Yule-Nielsen coefficient n is between 2 and 3, which allows use of CIE 1976 lightness (L*) or CIE 1976 color difference (ΔE) for the following approximately linear relation:

$$L^* = a_m L^*_m + a_{m+1} L^*_{m+1} \quad (2)$$

where $L^*_m$ and $L^*_{m+1}$ are the CIE lightness measured from the two base patterns $P_m$ and $P_{m+1}$, respectively, and $a_m$, $a_{m+1}$ are the numbers of $P_m$ and $P_{m+1}$ base patterns within the dot pattern.

Given the above, it should be noted that rather than attempting to measure the TRC using the entire set of dot patterns for a given halftone screen, it is more efficient to accurately measure the luminance of the M+1 base patterns generated with the target printer. The luminance measurements for the M+1 base patterns provide a set of calibration points defining the TRC. The remainder of the TRC then can be accurately estimated using modified Yule-Nielsen or any known equation establishing a relationship between the ink area coverage and the reflectance of the image created on the sheet. Furthermore, for most halftone screens the number of base patterns is much less than the total number of all possible dot patterns. Thus, by repeated printing and measuring of test patches one can obtain several measurements for each base pattern; thereby reducing measurement noise and increasing the accuracy of the measurements. This repeated printing and measuring can be accomplished without increasing, and often decreasing, the number of measurements required in the conventional method of TRC generation.

Figure 3:
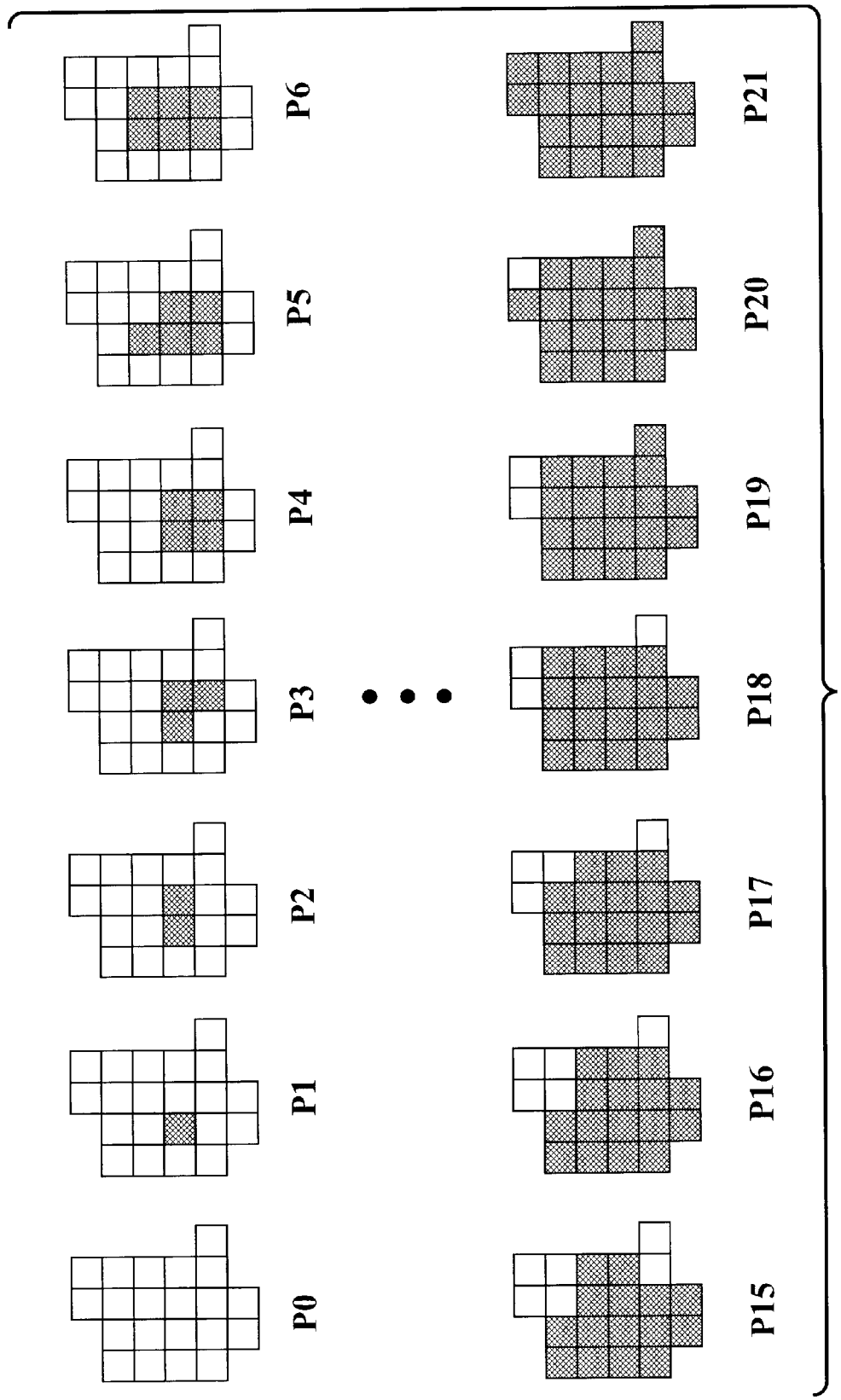
FIG. 3 illustrates the base patterns that can be generated form the base cell of FIG. 2.

For purposes of illustration, consider the stochastically clustered halftone screen shown in FIG. 1 as comprising twelve (12) base cells having 21 pixels each. FIG. 2 shows a base cell of the halftone screen of FIG. 1 wherein the numbers within the pixels illustrate the fill sequence of the base cell. FIG. 3 illustrates a portion of the set of 22 base patterns, $P_0, P_1, P_2, P_3, P_4, P_5, P_6, \ldots, P_{15}, P_{16}, P_{17}, P_{18}, P_{19}, P_{20}, P_{21}$, for the base cell of FIG. 2. A plurality of test patches are generated and printed using the target printer. The plurality of test patches beneficially includes at least one test patch corresponding to each of the base patterns, wherein such a corresponding test patch includes dot patterns comprised entirely of a single type of base pattern. The test patches are then scanned to obtain luminance or similar measurement for each of the test patches.

Figure 4:
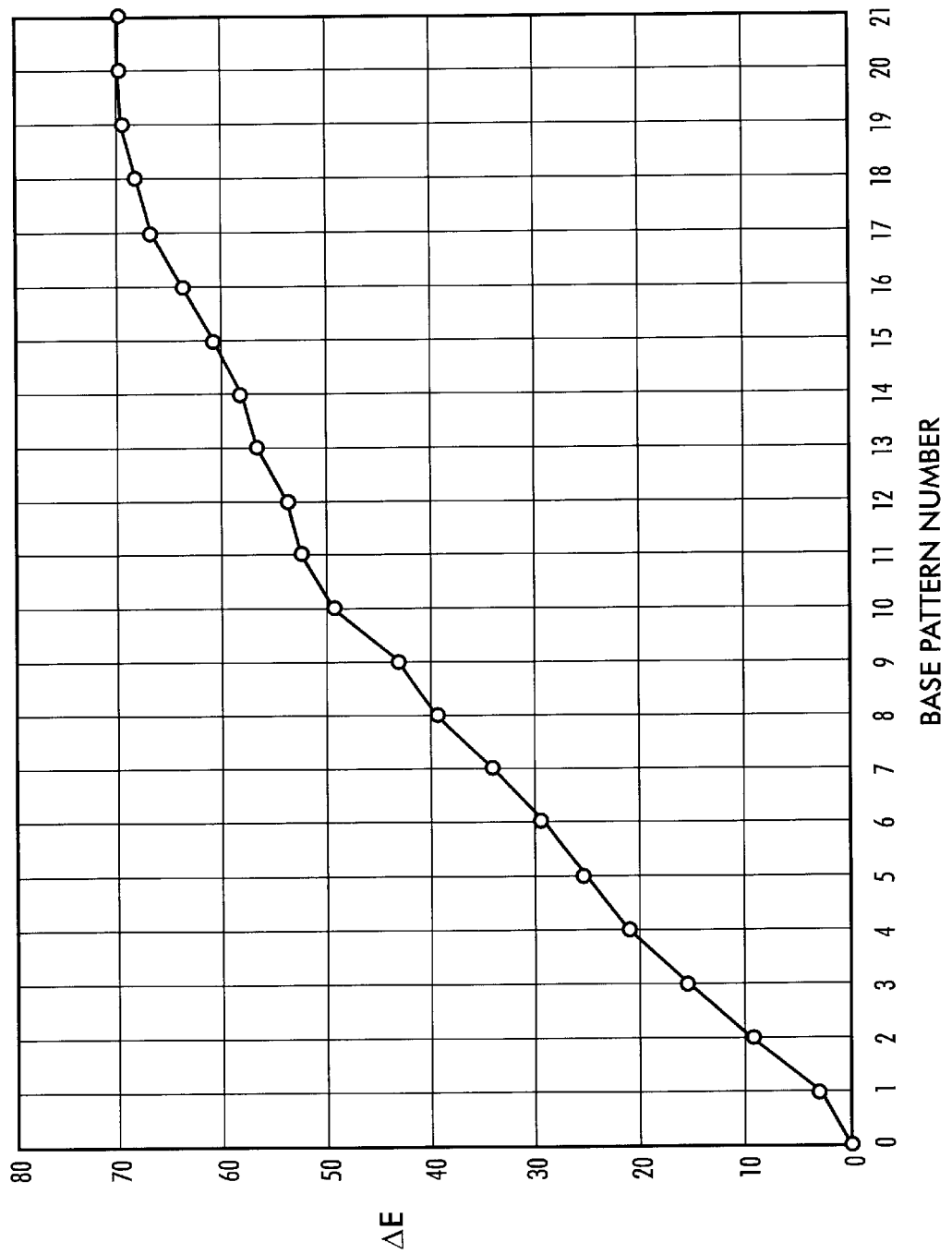
FIG. 4 illustrates a sample tone response curve generated in accordance with the teaching of the present invention.
Figure 5:
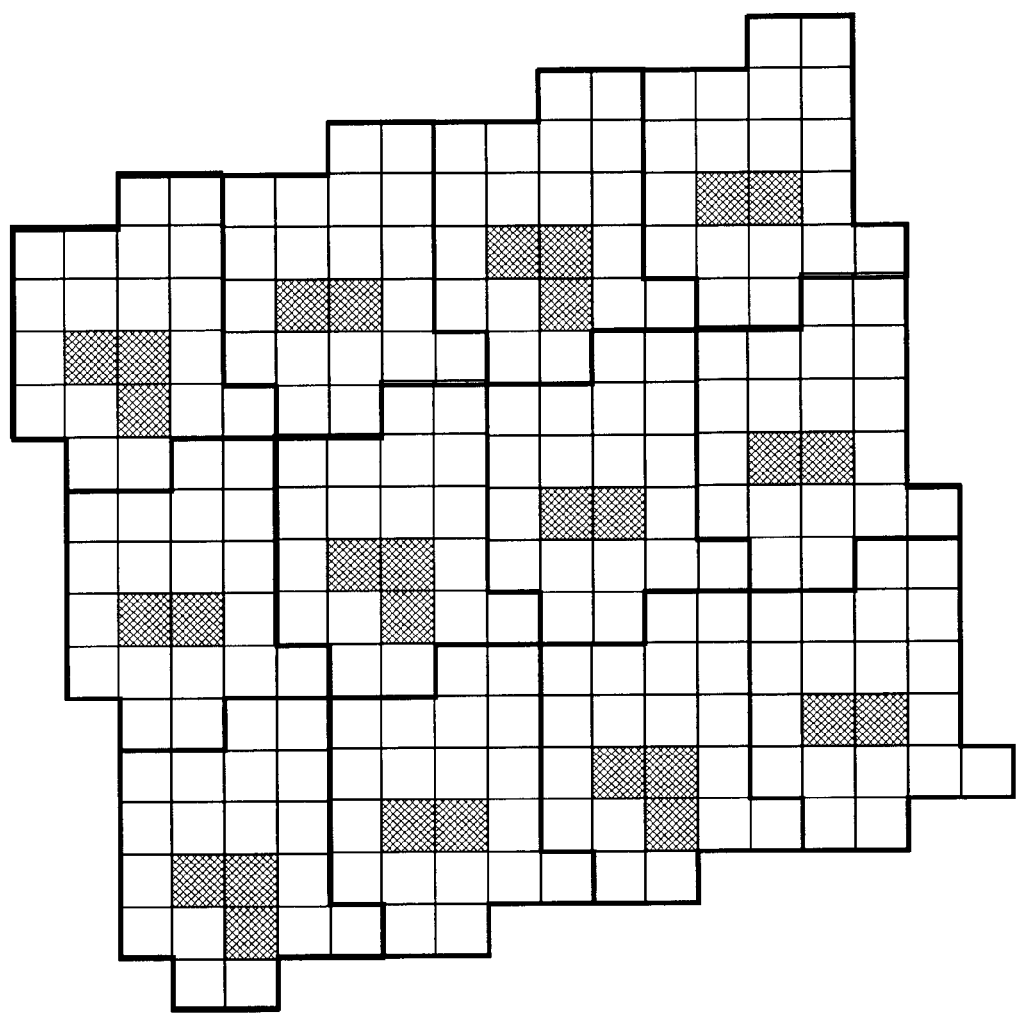
FIG. 5 illustrates a dot pattern having 29 pixels turned ON generated by the halftone screen of FIG. 1.

Measuring the luminance of a test patch for each of the 22 base patterns yields the 22 calibration points, shown as open circles in the graph of FIG. 4, on the TRC. In the graph of FIG. 4, the numbering of horizontal axis corresponds to the base pattern from which the calibration point is generated. The curve can be completed, that is the lines between each two adjacent calibration points are obtained, through use of equation 1 or 2, above. For example, to generate the TRC for a dot patterns comprised of some combination of base patterns $P_2$ and $P_3$ (i.e., including between 24 and 36 pixels turned ON within the dot pattern) such as the dot pattern comprising 29 pixels turned ON shown as in the graph of FIG. 5, using equation 1 yields:

$$r^{1/n} = \frac{7}{12} r_2^{1/n} + \frac{5}{12} r_3^{1/n}$$

where $r_2$ and $r_3$ are the measured reflectance of the test patches corresponding base patterns $P_2$ and $P_3$, respectively; and n is the Yule-Nielsen coefficient. Using equation 2 yields:

$$L^* = \frac{7}{12} L_2^* + \frac{5}{12} L_3^*$$

where $L_2^*$ and $L_3^*$ are obtained from CIE lightness measurements of the test patches corresponding base patterns $P_2$ and $P_3$, respectively.

It will be noted by those skilled in the art that the TRC of FIG. 4, although resembling a "conventional" TRC, does not provide the overall smooth tone response one would expect to see in a TRC generated in the conventional manner. This would be expected as conventional methods employ some form of data fitting or curve smoothing that replace jagged lines by a smoother curve line. While a curve smoothing technique can be applied to smooth the TRC of FIG. 4, such smoothing is discouraged as it tends to eliminate some subtle changes at knot points corresponding to calibration points yielding a distorted and less accurate TRC.

Figure 6:
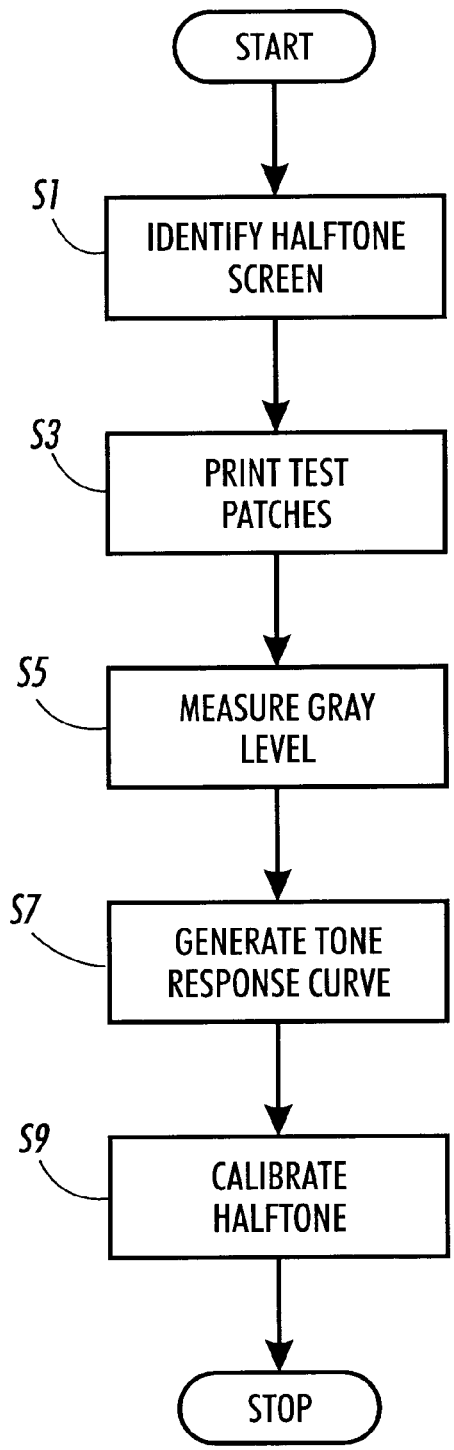
FIG. 6 is a flowchart illustrating an embodiment of a method for calibrating halftone screens according to the concepts of the present invention.

Turning now to FIG. 6, there is shown a flow chart illustrating a method for halftone calibration in accordance with the present invention. The process begins with the identification of the halftone screen to be calibrated at step S1. As discussed above, the present invention is suitable for calibrating any halftone screen that can be characterized as comprising base cells (sub-cells) with each of the base cells within the dot have the same size and shape. At step S3, a set of test patches are generated and printed using the target printer. Each test patch beneficially corresponds to a single base pattern and comprises one or more dot patterns with each dot pattern being comprised of the same type of base pattern. As discussed above, measurement noise can be reduced, increasing the overall accuracy, by obtaining a plurality of measurements for each base pattern. Beneficially this is accomplished by printing the same test patch corresponding to a given base pattern at a plurality of locations across the page in a random or pseudo-random fashion.

At step S5, the luminance of the test patches printed in step S3 is measured. The luminance measurements are plotted in step S7 to provide a set of calibration points defining the TRC. Additionally, at step S7 the response curve between adjacent calibration points is generated using the modified Yule-Nielsen equation or similar equation establishing a relationship between the ink area coverage and the reflectance of the image created on the sheet. Having obtained the calibrated TRC, the threshold values for the calibrated halftone screen can be readily determined in a known manner at step S9.

It should be appreciated that for selected halftone screens, additional accuracy in the printer calibration curve can be obtained by printing test patches for halftone dots comprising a combination of two base patterns in addition to test patches with dot patterns corresponding to a single base pattern. Measuring the luminance of the additional test patches provides further calibration points on a printer calibration curve (e.g., TRC) with the curve between the calibration points being generated using an equation establishing a relationship between the ink area coverage and the reflectance of the image created on the sheet in the same manner as described above.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of calibrating a printing device for a halftone screen, comprising:

generating a plurality of test patches, each test patch comprising a dot pattern having less than three different base patterns for the halftone screen;

measuring the luminance of selected ones of the test patches;

plotting the luminance measurements to provide a set of calibrated points on a printer calibration curve;

generating the printer calibration curve between adjacent calibrated points using an equation establishing a relationship between ink area coverage and reflectance of the image.

2. The method of claim 1, wherein the equation establishing a relationship between the ink area coverage and the reflectance of an image is given by:

$$r^{1/n} = a_m r_m^{1/n} + a_{m+1} r_{m+1}^{1/n}$$

where $a_m$, $a_{m+1}$ are the numbers of $P_m$ and $P_{m+1}$ base patterns within the dot pattern; $r_m$, $r_{m+1}$ are the reflectance of the $P_m$ and $P_{m+1}$ base patterns within the dot pattern; and n is the Yule-Nielsen coefficient.

3. The method of claim 2, wherein the reflectance $r_m$ is obtained by measuring a test patch comprised substantially of $P_m$ base patterns.

4. The method of claim 1 wherein the equation establishing a relationship between the ink area coverage and the reflectance of an image is given by:

$$L^* = a_m L^*_m + a_{m+1} L^*_{m+1}$$

where $a_m$ is the number of $P_m$ base patterns within the dot pattern, $a_{m+1}$ is the number of $P_{m+1}$ base patterns within the dot pattern, and $L^*_m$ and $L^*_{m+1}$ are lightness measurements for the two base patterns $P_m$ and $P_{m+1}$.

5. The method of claim 4, wherein the lightness measurement $L^*_m$ is obtained by measuring a test patch comprised substantially of $P_m$ base patterns.

6. The method of claim 4, wherein the lightness measurement $L^*_m$ is a CIE lightness measured from a test patch comprised substantially of $P_m$ base patterns and $L^*_{m+1}$ is CIE lightness measured from a test patch comprised substantially of $P_{m+1}$ base patterns.

7. The method of claim 1, further comprising generating threshold values for the halftone screen from the printer calibration curve.

8. The method of claim 1, wherein the step of generating a plurality of test patches comprises printing test patches with each test patch corresponding to a dot pattern comprised of substantially a single base pattern.

9. The method of claim 8 wherein the step of generating a plurality of test patches comprises printing at least one test patch corresponding to a dot pattern comprised of substantially a single base pattern for each of the base patterns of the halftone screen.

10. The method of claim 1, further comprising:

generating a composite test patch including a dot pattern comprising of a combination of two types of base patterns;

measuring the luminance of the composite test patch; and plotting the luminance measurement of the composite test patch with the set of calibrated points.

* * * * *